United States Patent [19]
Somerville

[11] 4,351,726
[45] Sep. 28, 1982

[54] TRAVELING BELT FILTER HAVING VACUUM CHANNELS FORMED ALONG EDGES OF SAID BELT

[76] Inventor: Robert L. Somerville, Old Amwell Rd., Rte. 1, Box 256, Neshanic, N.J. 08853

[21] Appl. No.: 250,647

[22] Filed: Apr. 3, 1981

[51] Int. Cl.³ .............................................. B01D 33/00
[52] U.S. Cl. ..................................... 210/401; 210/406
[58] Field of Search ............... 210/241, 386, 400, 401, 210/406, 416.1, 455, 541; 162/337, 349, 352; 209/307, 308; 34/92, 236

[56] References Cited

U.S. PATENT DOCUMENTS

| | | | |
|---|---|---|---|
| 2,094,350 | 9/1937 | Cartisny | 210/401 |
| 2,101,042 | 12/1937 | Casey | 210/541 |
| 2,101,109 | 12/1937 | Thomson | 210/541 |
| 3,168,471 | 2/1965 | Hirs | 210/401 |
| 3,874,998 | 4/1975 | Johnson | 162/352 |
| 3,939,077 | 2/1976 | Seibert | 210/401 |

*Primary Examiner*—David R. Sadowski
*Attorney, Agent, or Firm*—Eugene E. Geoffrey, Jr.

[57] ABSTRACT

Filter apparatus having a traveling belt for extraction of a filtrate from a slurry which includes an elongated trough having a bottom and side walls for receiving the slurry to be filtered, an endless transversely ridged belt with the upper portion thereof disposed on the base of the trough and movable relative thereto, the edges of the belt being spaced from the side walls, a filter cloth overlying the belt and a portion of the side walls and movable with the belt and vacuum ports extending lengthwise of the trough and opening into the bottom of the trough between the edges of the belt and the side walls.

16 Claims, 10 Drawing Figures

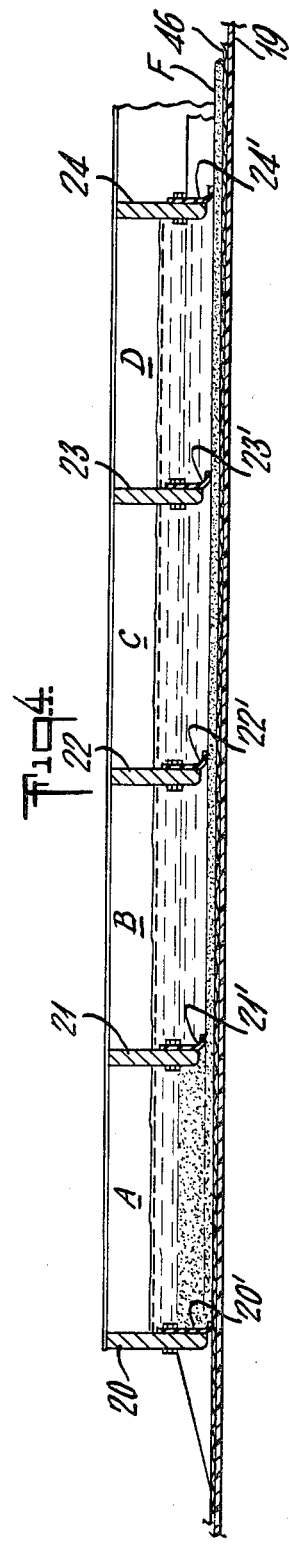
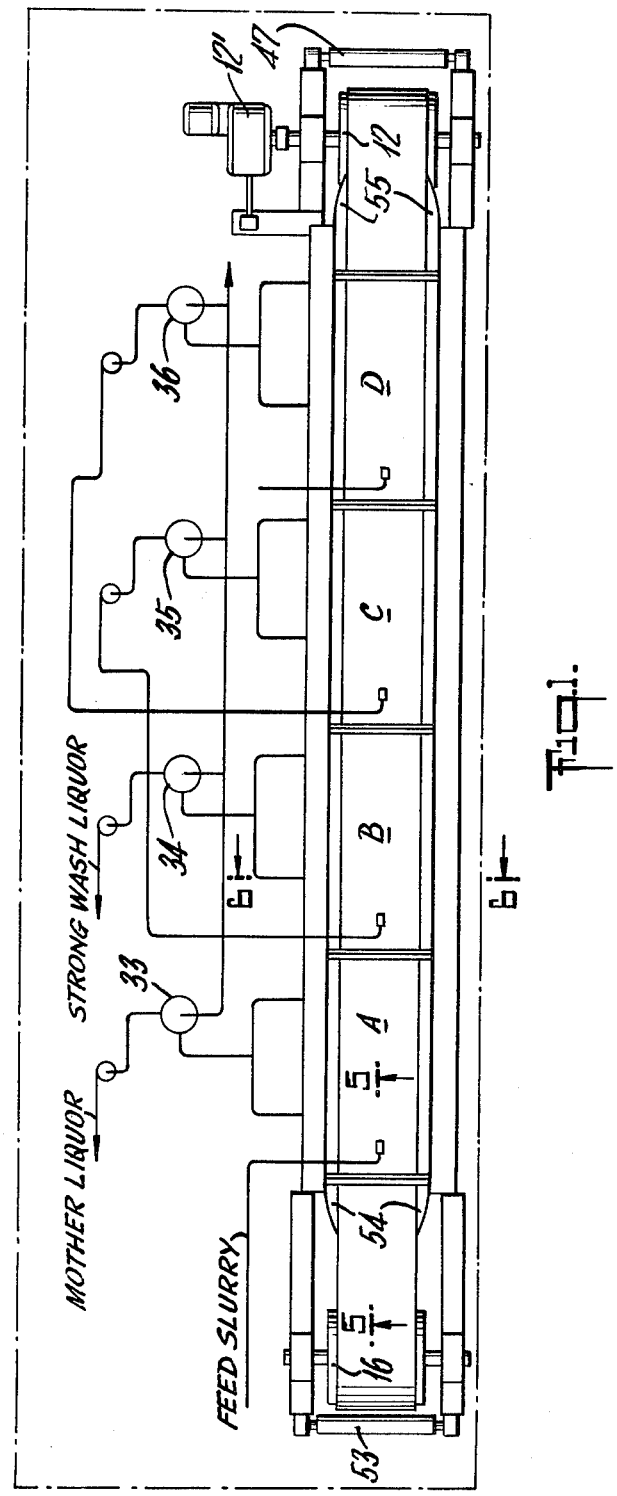

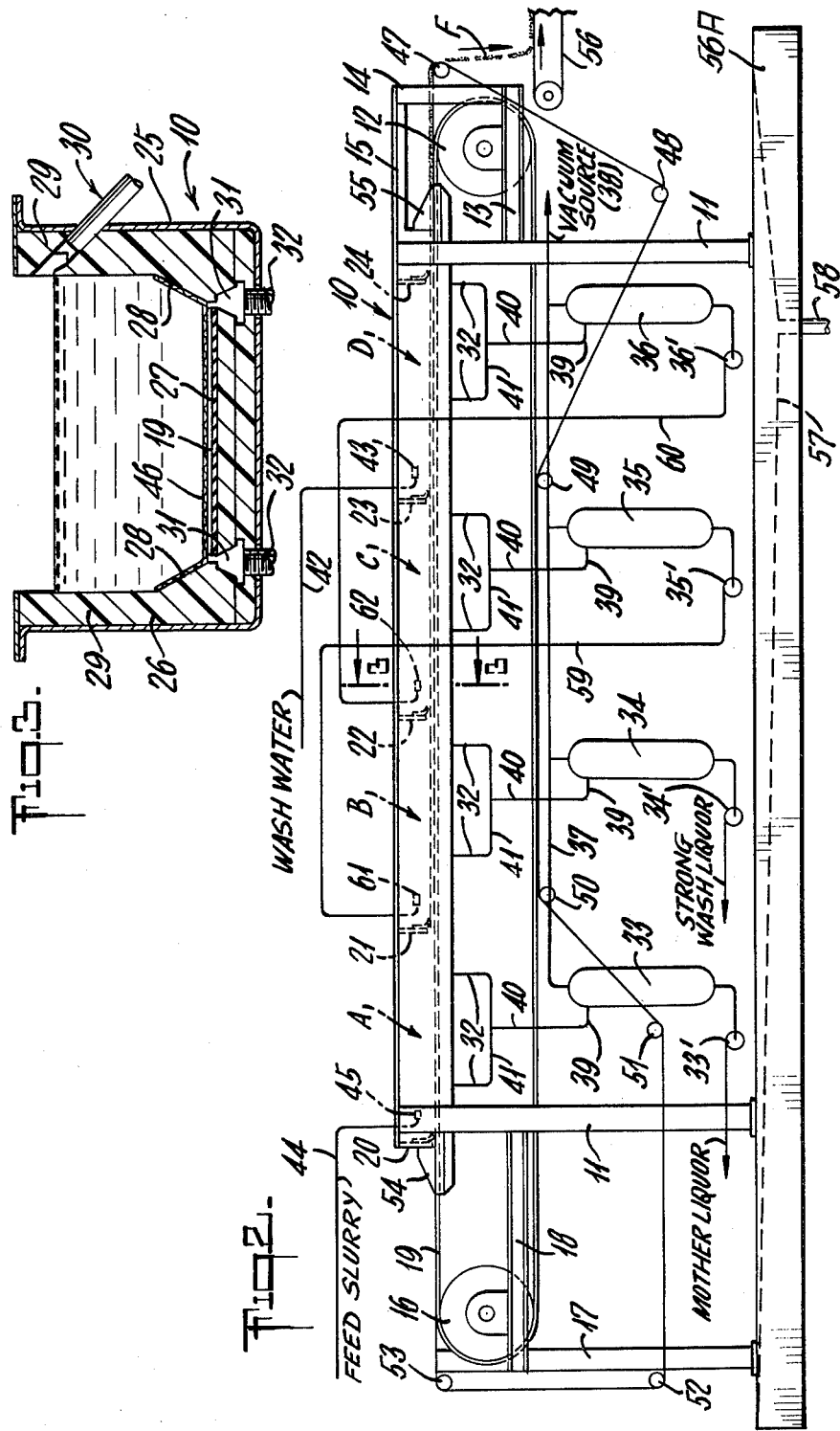

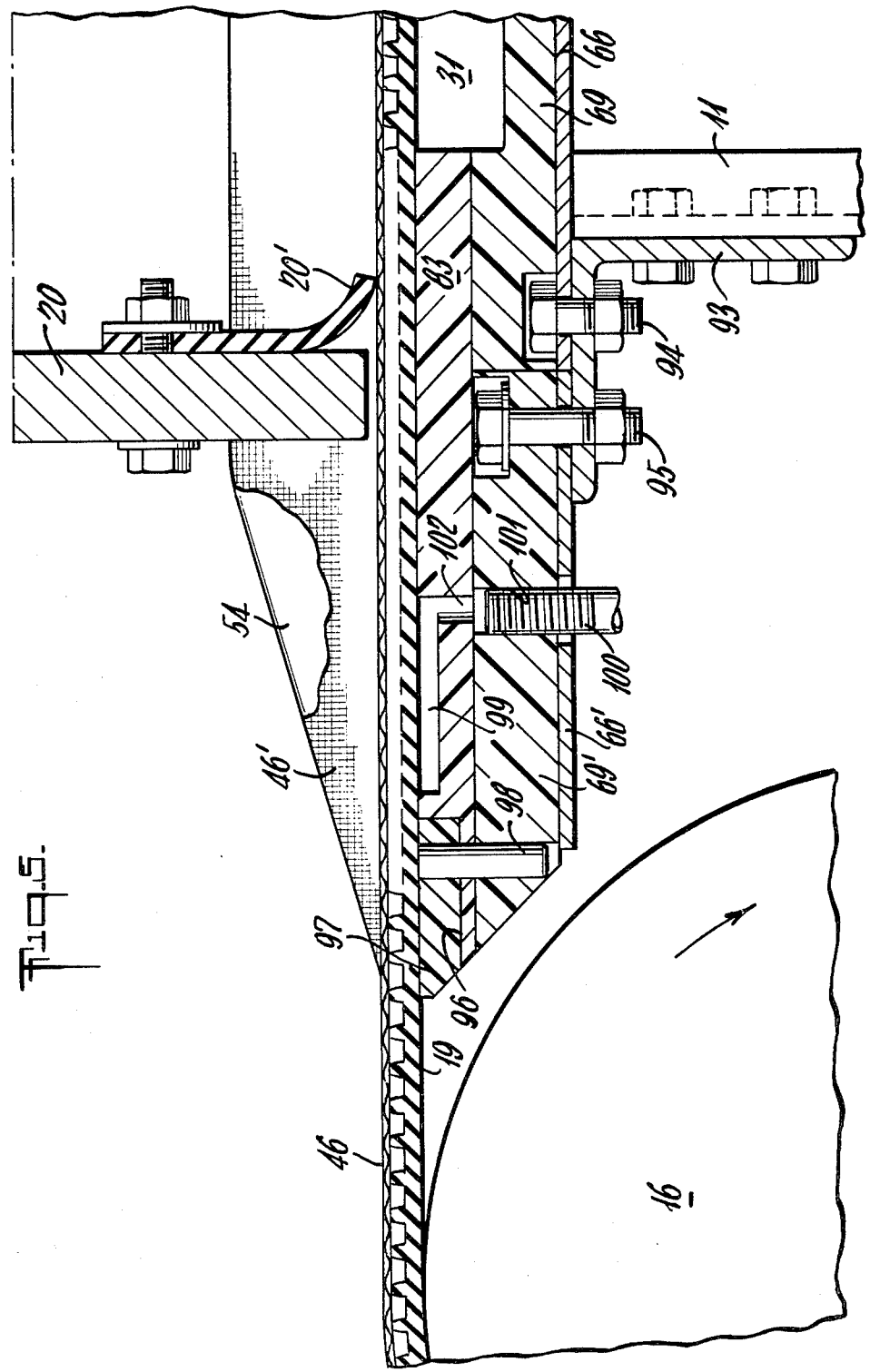

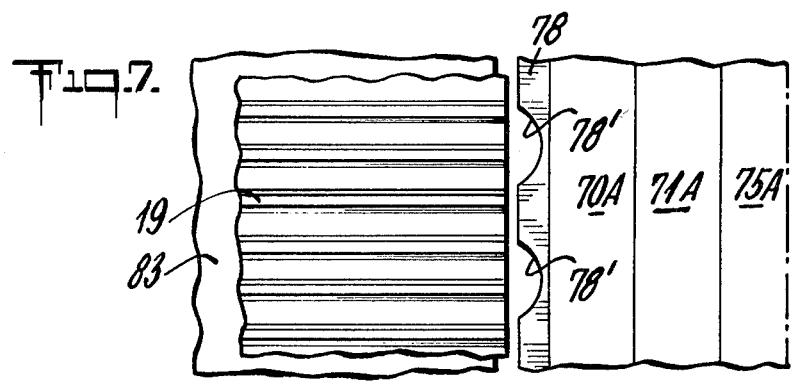
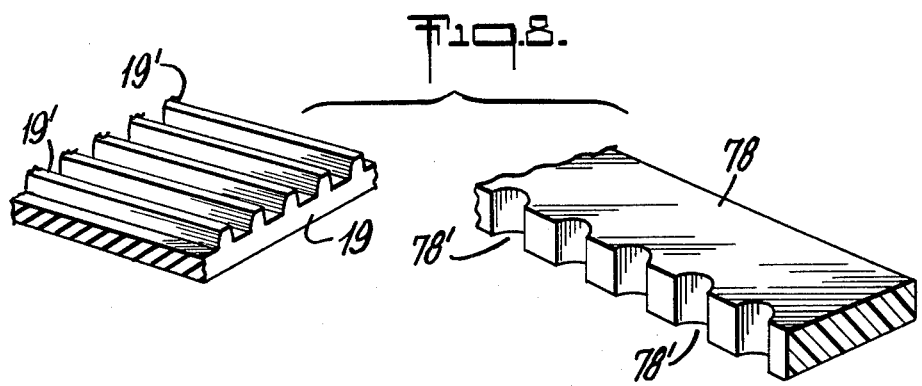
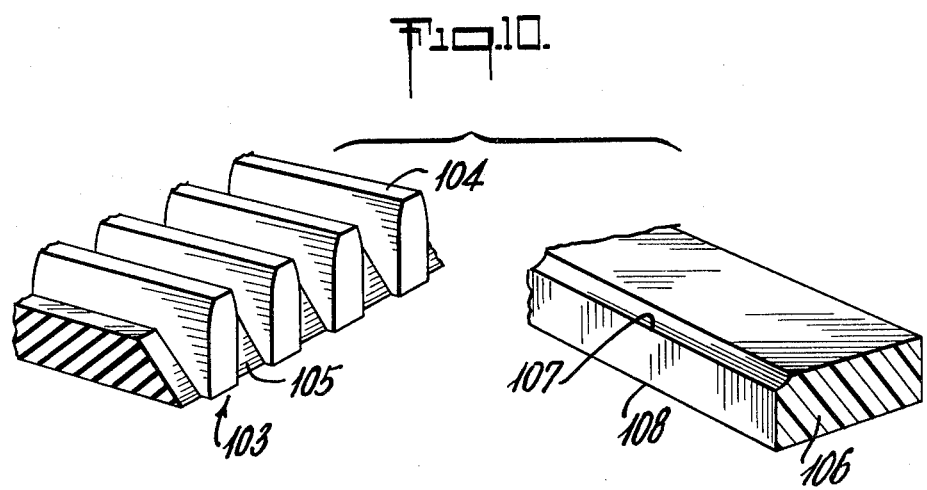

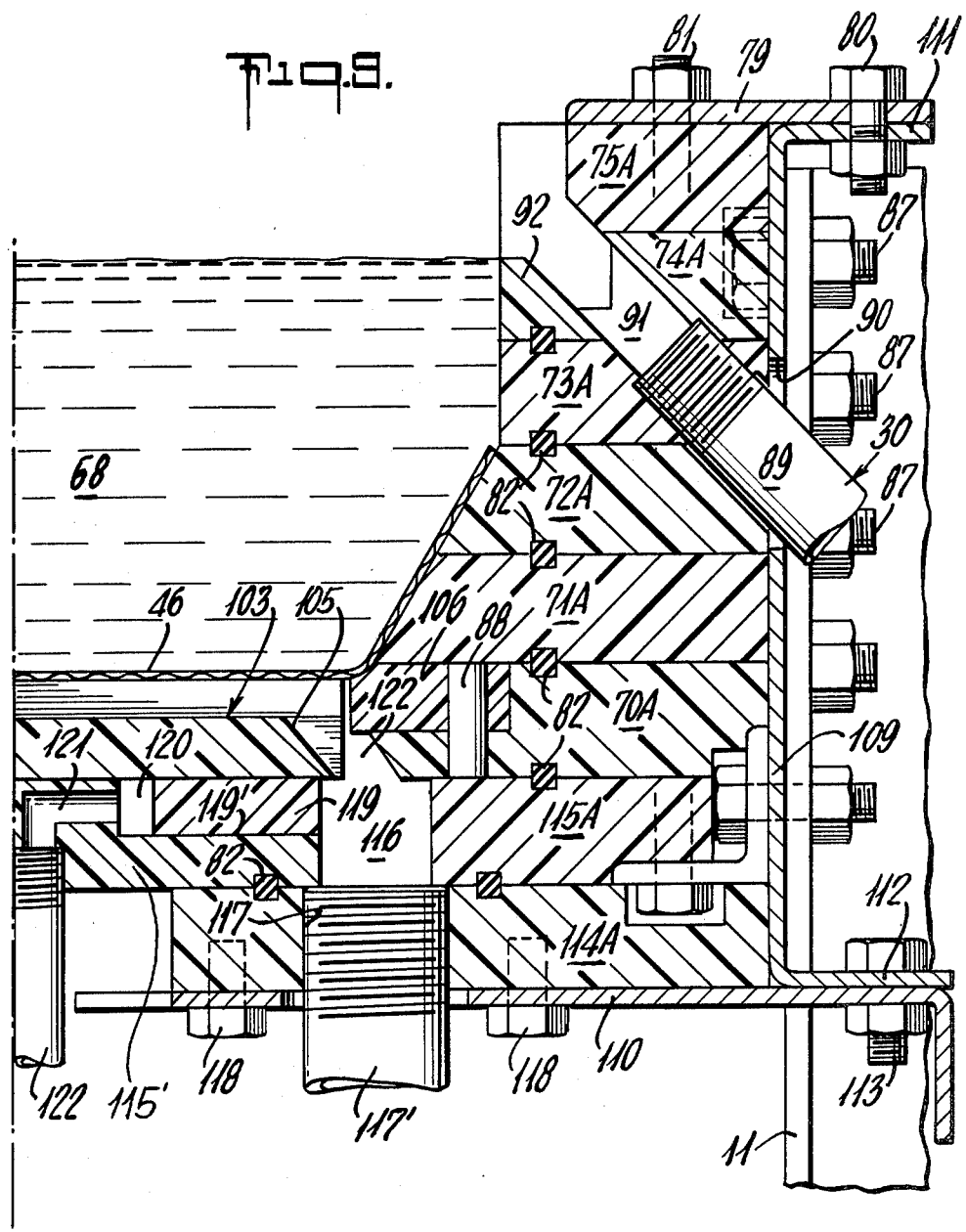

TRAVELING BELT FILTER HAVING VACUUM CHANNELS FORMED ALONG EDGES OF SAID BELT

This invention relates to traveling belt filters for the removal of soluble components from a liquid slurry containing solids and more specifically to a novel and improved traveling belt filter utilizing vacuum for removal of the filtrate which provides for effective removal of the soluble components while at the same time greatly reducing friction of the belt on the supporting structure and severe stresses on the belt which ultimately results in permanent distortion thereof as well as the filter cloth carried by the belt.

Known belt filters have generally employed an enlongated trough and a centrally perforated carrier belt of fabric reinforced rubber or other similar material with transverse grooves which support a filter fabric. A vacuum box in the form of a U-shaped channel extends throughout the length of the filter and underlies the central portion of the belt for withdrawal of filtrate from the slurry retained in the trough. As a result, the utilization of the vacuum creates substantial drag on the belt and of course contributes very substantially to power requirements excluding of course the power required for the vacuum pumps and associated equipment required for the filtering operation. Prior art filters also encountered edge sealing problems and known procedures for the resolution of these difficulties have included the utilization of soft rubber curbs vulcanized to the carrier belt with the result that large drive and idler pulleys were required and frequent belt failures occurred due to repeated flexing and chemical attack. A further problem entailed with known filters is the so-called "edge effect". With known traveling belt filters, difficulty is often entailed with filtration of the edges of the filter and while the problem exists on all filters, it is particularly pronounced in the case of small filters. Furthermore, known filter designs do not lend themselves to very small traveling belt filters for use in connection with precise pilot plant work.

This invention overcomes the difficulties heretofore entailed with known traveling belt filters and provides a novel and improved filter functioning at a relatively high degree of efficiency both as to power requirements and filtration effectiveness. Moreover, the belt does not require the formation of holes throughout the central portion of the belt and by reason of a novel and improved structure, the life of the belt as well as the supporting equipment is greatly increased.

Another object of the invention resides in the provision of a novel and improved traveling belt filter which avoids both the problem of edge effect and distortion of the belt and overlying filter cloth with the result that more effective filtration is obtained and at the same time the life of the filter cloth and the carrier belt is greatly increased.

Still another object of the invention resides in the provision of a novel and improved traveling belt filter characterized by its relatively low cost, ease of maintenance, effectiveness in operation and relatively long life.

A still further object of the invention resides in the provision of a novel and improved traveling belt filter.

The traveling belt filter in accordance with the invention utilizes an endless conveyor belt having transverse grooves throughout the entire width thereof and is completely devoid of holes or other perforations. The belt is maintained within a channel or trough and vacuum boxes are positioned below and adjoining each edge of the belt and may extend throughout the length of the channel. The belt is lubricated by a fluid, as for instance air or water, and a filter cloth overlies the filter belt. By reason of the elimination of centrally disposed vacuum boxes, drag caused thereby is avoided and consequent distortion of the belt is eliminated. As a result, the filter cloth will not slip relative to the belt and the recurring problem of cloth creasing, which often results in cloth destruction is greatly minimized, if not eliminated, and at the same time more efficient filtration is effected. The sides of the channel are constructed of a material having relatively low friction coefficient and the improved filter cloth arrangement wherein the cloth is extended to overlie the sides of the channel or trough will not be retarded in its motion as the belt is transported. The invention further facilitates the utilization of wash liquor overflows which when utilized for filtering a fast settling slurry, greatly increases the filter capacity since clear supernatant liquid can merely overflow instead of being drawn through the filter cloth.

The above and other objects and advantages of the invention will become more apparent from the following description and accompanying drawings forming part of this application.

IN THE DRAWINGS

FIG. 1 is a plan view in partially diagrammatic form illustrating one embodiment of a traveling belt filter in accordance with the invention;

FIG. 2 is a side elevational view in partially diagrammatic form of the structure illustrated in FIG. 1;

FIG. 3 is a cross-sectional view of FIG. 2 taken along the line 3—3 thereof;

FIG. 4 is a fragmentary longitudinal cross-sectional view of the filter shown in the preceding figures;

FIG. 5 is an enlarged detailed cross-sectional view of the filter shown in FIG. 1 and taken along the line 5—5 thereof;

FIG. 7 is a fragmentary top view of the structure shown in FIG. 6 taken along the line 7—7 thereof;

FIG. 8 is a perspective view of fragmentary portions of the traveling belt and adjoining filter structure which provides for the removal of filtrate on relatively small filters;

FIG. 9 is an enlarged cross-sectional view of a modified filter design for utilization in large filters; and FIG. 10 is a perspective view of fragmentary portions of a belt and the adjoining filter structure for use on the filter as illustrated in FIG. 9.

Figure 6:
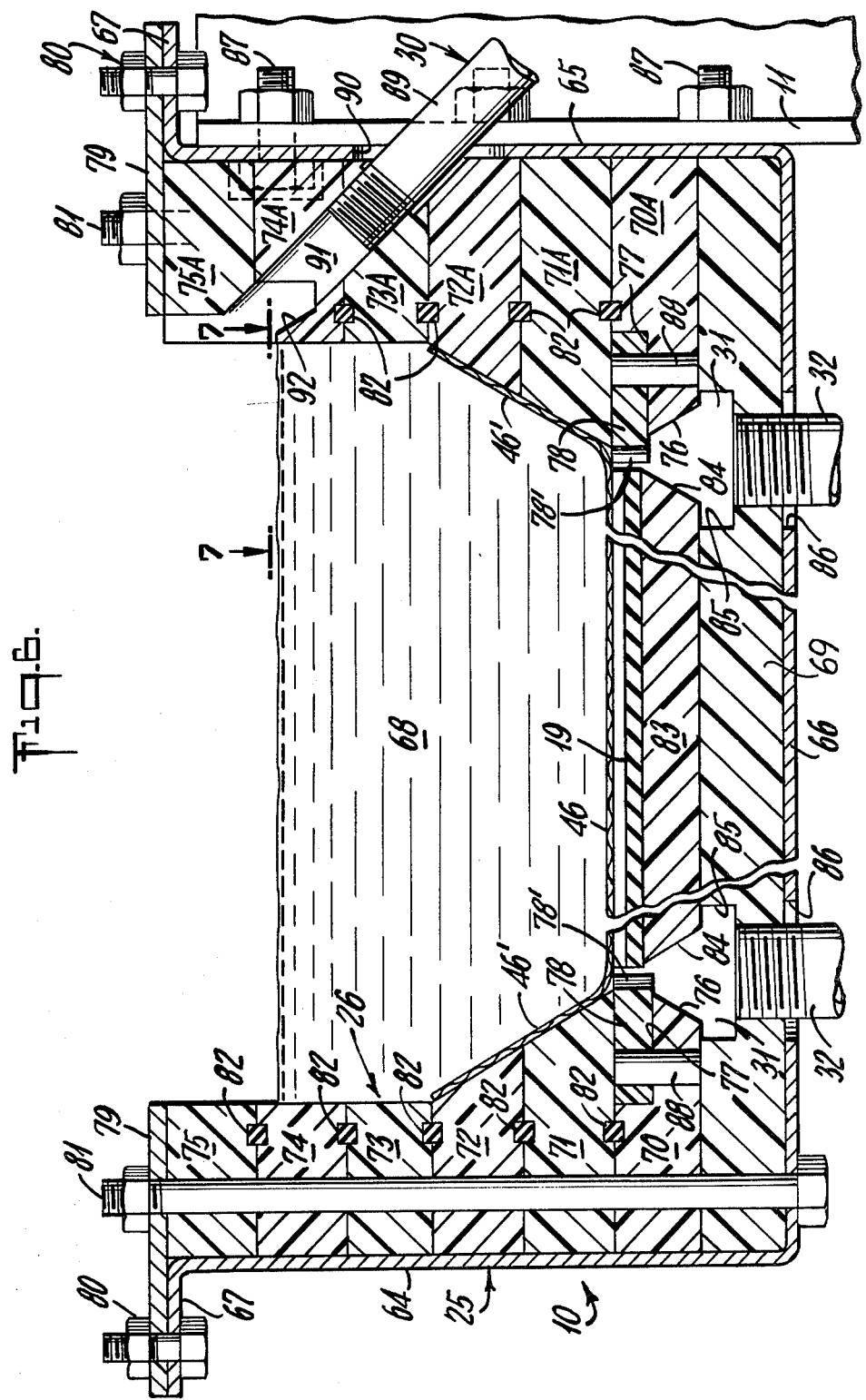
FIG. 6 is an enlarged detailed cross-sectional view of the filter shown in FIG. 1 and taken along the line 6—6 thereof.

Referring now to the drawings and more specifically to FIGS. 1 through 4 illustrating one embodiment of the invention, the filter includes a trough or channel-shaped structure generally denoted by the numeral 10 supported by frame members 11. A drive roller 12 is carried by frame members 13, 14 and 15 supported by the frame members 11 and an idler roller 16 is carried by frame elements 17 and 18 the latter being affixed to the frame member 11. A transversely grooved belt 19 is carried by the rollers 12 and 16 and rides on the inner surface of the channel structure 10 as shown more clearly in FIG. 3. The channel structure 10 is further provided with an inlet dam 20, partitioning dams 21, 22 and 23 and an outlet dam 24. These dams divide the trough or channel 10, in this embodiment of the invention, into four discrete filtering sections A, B, C and D.

While the channel 10 will be described in detail in connection with FIGS. 5 through 8, it will be observed in FIG. 3 that the channel 10 which may be formed in sections has an outer U-shaped housing 25, a liner of a suitable material having a low coefficient friction such as ultra-high molecular weight polyethylene 26 or the equivalent. The channel 25 has a base 27 on which the belt 19 rides, inclined edge portions 28 and vertical edge portions 29. One or more overflow channels 30 may be provided for each of the sections A through D. At the outer edges of the base 27, there are provided longitudinal channels 31 shown more clearly in FIG. 6 and vacuum outlet conduits 32 communicating therewith and spaced periodically along the length of the channel 10 for withdrawal of the filtrate. In FIGS. 1 and 2, it will be observed that the filtrate reservoirs 33 through 36 are provided for each of the filter sections A through D. These reservoirs are closed containers each having an upper opening coupled to a main conduit 37 connected to a vacuum source 38 not shown. The upper portion of each reservoir has a filtrate inlet conduit 39 connected by means of conduits 40, 41 and 32 to the channels 31 for removal of the filtrate. The filtrate removed from section A is generally called the mother liquor and is removed from the reservoir 33 by a pump 33'. The filtrate removed from section B of the filter and fed to the reservoir 34 is termed strong wash liquor and is removed by the pump 34'. The filtrate removed from section C of the filter and accummulated in reservoir 35 may be recirculated by a pump 35' to the filter section B if desired. Similarly, the filtrate in reservoir 36 is recirculated by a pump 36' to the filtrate section C. Wash water is fed through a conduit 42 to an outlet 43 disposed within the filter section B. At the same time, slurry to be filtered is fed through the conduit 44 to an outlet 45 in filter section A. This procedure for handling the filtrates is generally desirable in order to conserve the quantity of wash water required and provide a wash liquor having substantially greater concentration of soluble components.

As previously pointed out, the belt 19 has transverse grooves and carries a filter cloth 46 as shown more clearly in FIG. 3 which rides on the belt with the edges overlying the inclined portions 28 of the channel 10. While the belt 19 is carried by the rollers 12 and 16 with the roller 12 being driven by a suitable motor 12', the filter cloth 46 upon leaving the right hand end of the belt as illustrated in FIG. 2 passes about a roller 47, thence downwardly about roller 48, then upwardly about rollers 49 and 50, thence about rollers 51, 52 and 53 where it engages the belt 19 as the latter leaves the roller 16. In as much as the filter cloth is wider than the belt, ramps 54 are provided to curve the filter cloth upwardly to meet the inclined edges 28 of the channel or trough 10. Similar exit ramps 55 are provided to guide the edges of the filter cloth to a horizontal plane for movement about the rollers 47 through 53. Movement of the cloth about the rollers 47 to 53 functions to remove remnants of the filter cake F which is discharged as the filter cloth passes about the roller 47. The removed filter cake is then carried by a belt 56 to a suitable collection point. In as much as liquids may drip from the fabric screen 46 during its return path, a base 56 may be provided with a drain pan 57 having a drain 58 therein to collect the liquid for disposal or recycling.

In the operation of the belt filter thus far described, the slurry is fed into section A of the filter and the dam 20 includes a transverse rubber seal 20' to retain the slurry within the section A. At the same time, some of the slurry may flow past the dam 21 and into the section B. Wash water is fed to the section D and by reason of the action of the vacuum system wash water will be fed back to the outlet 62 within the section C and in turn through the vacuum system for section C and thence to the outlet 61 in section B. Since the vacuum is applied to channels or ports adjoining both edges of the belt 19 and since the belt is transversely ribbed, filtrate will be drawn into the longitudinal channels 31 and removed through the outlets 32. The liquid withdrawn from section A will be the mother liquor having a very high concentration of soluble components. As shown in FIG. 4, the solids will tend to form a cake on top of the filter cloth 46, but since the dam 21 is spaced from the filter cloth and has a seal 21' of rubber or other suitable resilient material the initially formed filter cake will pass beneath the dam 21. The same process is then repeated in section B though the liquor or filtrate removed while having a high concentration of soluble components will not have the concentration of the mother liquor. However, the cake formed in section B may be somewhat more dense than the cake formed in section A. Filtration continues through sections B to D and each of the dams 22 and 23 include transverse sealing elements 22' and 23' to facilitate movement of the cake beneath the dams. In section D, most of the soluble components have been removed and the cake F is discharged from the filter cloth 46 as the latter moves over the roller 47 as illustrated in FIG. 2. In addition, overflows 30 may be provided to simplify process controls and are particularly advantageous when filtering a fast settling slurry with the result that the filter capacity can be greatly increased since the supernatant liquid can overflow instead of filtering through the cloth.

It will be observed that with the utilization of vacuum at the edges of the belt, belt drag is not only minimized but the problems of belt deformation and resultant creasing and distortion of the filter cloth is substantially obviated as the cloth will not slip relative to the belt. Furthermore, the avoidance of belt drag due to vacuum reduces the power requirements to about one-quarter of that required utilizing a central vacuum chamber as taught by the prior art. As will be shown, lubrication is preferably provided for the belt 19 to further minimize friction between the belt and its supporting surface.

FIGS. 5 through 8 illustrate the detailed structure of the traveling belt filter heretofore described. In these figures, the non-metallic materials illustrated are preferably formed of ultra-high molecular weight polyethylene or other similar material. In certain instances, tetrafluoroethylene has been employed and those instances will be indicated.

FIGS. 5 and 6 are enlarged cross-sectional views of the structure shown in FIGS. 1 and 2. While the channel 10 through which the revolving belt extends in the instant embodiment of the invention is fabricated in a single length, it will become apparent that the channel 10 can be fabricated in sections and assembled at the point of use.

The channel structure 10 includes an elongated U-shaped structure 25 of stainless steel or other suitable material having side walls 64 and 65, a bottom wall 66 and outwardly extending longitudinal flanges 67. As previously pointed out, the U-shaped structure 25 is lined with a suitable high density plastic such as high-molecular weight polyethylene 26 and in the instant embodiment of the invention the linear is fabricated of individual layers shaped to form the central trough 68 though it is evident that portions may be precast in one piece. More specifically, the liner includes a bottom layer 69 and overlying layers 70 through 75 and 70A through 75A. The bottom layer 69 extends throughout the bottom of the U-shaped structure 25. The layers 70 and 70A comprise relatively narrow elongated strips of material having reversely inclined edge portions 76 and recesses 77 to receive blocks 78 formed of tetrafluoroethyelene or other similar material. The next successive layers 71, 72 and 71A, 72A have tapered inner edges to form inclined surfaces 28 for supporting the edges 46' of the filter cloth 46. Blocks 73, 74 and 75 and blocks 73A, 74A and 75A are essentially rectangularly shaped and extend the trough to the desired height. Metal plates 79 overlie the upper surfaces of the blocks 75 and 75A and are secured in position to the flanges 67 by nut and bolt assemblies 80 engaging cooperating openings in the flanges 67 and the plates 79. The entire assembly is held in position by elongated bolts 81 extending through cooperating openings in the layers, the bottom 66 of the channel 25 and the flanges 67. In addition, the layers 70 through 75 and 70A through 75A are sealed one to the others by resilient seals 82 retained in cooperating recesses in contiguous surfaces of the layers 70 through 75 and 70A through 75A or the layers may be sealed by any other suitable sealant.

A bed for the endless belt 19 is provided by an elongated strip of material 83, secured to the layer 69, having reversely inclined edge portions 84 spaced from the edge portions 76. The layer 83 has a total width approximately equal to the width of the belt 19. The base layer 69 further includes a pair of elongated recesses 85 which in combination with the gap between the inclined surfaces 76 and 84 form vacuum recesses or channels along each edge of the belt 19. Periodically openings 86 are drilled through the base 66 of the channel 25 to accommodate the vacuum conduits 32 which threadably engage cooperating openings in the layer 69 communicating with the channels 31.

Referring to FIGS. 7 and 8, it will be observed that the edge of the belt 19 is in spaced relationship to the edge of the block 78 and secondly the strip 78 has recesses 78' along the edge thereof facing the belt 19. In this way, elongated vacuum ports positioned at each edge of the belt 19 function to withdraw filtrate into the tanks 33 through 36 previously described. At the same time, the vacuum ports beneath the center of the belt are completely eliminated so that the belt 19 will move freely on the central layer or strip 83 and not be deformed in any way nor will it deform the filter cloth which overlies the belt 19. The belt 19 is also provided with a plurality of transverse ridges 19' which support the filter cloth and in this way provide channels for rapid removal of filtrate.

As previously mentioned, the channels 10 are supported by frame members 11 which may be secured thereto by bolts 87 or other suitable fastening means. While the frame members 11 are shown on only one side of the channel 25 in FIG. 6, it is obvious that such frame members are utilized on both sides of the channel 10. It will also be observed that the strips 78 are held in position with the recesses 77 by a series of pins 88 which are held in place between the facing surfaces of the bottom layer 69 and the overlying layers 71 and 71A.

If desired, each section A, B, C and D may include one or more overflow conduits 89. For this purpose, the wall 65 of the U-shaped housing 25 is provided with an opening 90 for each conduit 89 and an opening 91 is drilled through the layers 74A, 73A and 72A at an inclination and in line with the opening 90 and the opening 91 is threaded to facilitate attachment to the conduit 89. In addition, the layer 74A is cut away to form a dam or weir 92 which determines the level of the liquid within the trough 68.

The end sections of the filter structure shown in FIG. 6 are essentially identical and accordingly only the front end section as illustrated in FIG. 5 will be described.

It will be observed in FIG. 5 that the upper end of the frame member 11 carries an angle member 93 and the bottom 66 of the channel 25 terminates midway of the angle member 93 and is secured thereto by means of a bolt and nut generally denoted by the numeral 94. The base layer 69 also terminates midway of the upper surface of the angle 93 and an end section 69' for the layer 69 and the end section 66' of the base 66 are secured in position by the bolt and nut assembly 95. The layer 83 on which the belt rides extends to the left end of the layer 69' and includes a recessed end portion 96 for receiving and holding an insert of tetrofluoroethylene or other similar material 97. The insert 97 is held in place by a plurality of pins 98 which may be threaded if desired.

As previously pointed out, the surface of the layer 83 which supports the belt 19 is preferably lubricated with either air or water and for this purpose the end portion of the layer 83 as shown in FIG. 5 is provided with a transverse channel 99 and a lubricant such as water for instance, is fed to the channel by means of a conduit 100 threadably engaging an opening 101 through the base layer 69' and a second opening 102 coupling the opening 101 to the transverse channel 99. In FIG. 5, movement of the belt 19 is to the right with the result that water is carried by the belt and functions to lubricate the underside of the belt. Since the quantity of liquid such as water required for lubrication is relatively small and since the vacuum outlets for removal of filtrate are along the edges of the belt, the quantity that may be withdrawn by reason of the vacuum system is relatively small. As will be shown in FIG. 9, drains can be provided continuously or periodically along the edges of the belt in order to prevent lubricating water or other fluid from becoming mixed with filtrate. The utilization of water or other liquid as the lubricant and the positioning of the vacuum outlets adjoining the edges of the belt substantially reduces the power requirements while maintaining excellent filtering efficiencies. Actual measurement on prior filters have indicated that of the total power requirement for the operation of the filter approximately 75 percent is expended in movement of the belt. For instance, if a centrally located vacuum box four inches wide extends throughout the length of an eighty-foot filter, ten pounds per square inch of vacuum is utilized to extract the filtrate and the belt has a friction factor of 0.25 there will be produced a drag of ten pounds per linear inch or a total of 9,600 pounds. If the belt is moving at 100 feet per minute, this will amount to roughly 29 horsepower. With the filter in accordance with this invention, power requirements for driving an equivalent belt can be reduced to approximately 25 percent.

The ramps 54 illustrated in FIG. 5 are shaped to gradually curve the edges of the filter cloth upwardly to engage the inclined edges of the trough 68. The inclined edge portion of the filter cloth 46 shown in FIG. 5 is denoted by the numeral 46'. Furthermore, since the dam 20 is positioned at the end of the trough 68, the flexible rubber seal 20' carried by the dam 20 is appropriately shaped to seal the edges of the dam.

The belt 19 utilized in the filter heretofore described is shown more clearly in FIG. 8 and has squared side edges and vacuum ports are provided by the adjoining strip of material 78 as also shown in FIG. 8 by forming semi-circular notches spaced along the edge thereof. This arrangement is particularly suitable for smaller filters of the order of ten to twenty inches in width. With larger filters having widths of the order of two to six feet and even larger, a modified belt construction is shown in FIG. 10 and denoted by the numeral 103. This belt has transverse ribs 104 similar to the ribs 19' on the belt 19 and the edges of the ribs are at right angles to the transverse direction of the ribs. However, the portions of the belt between the ribs have inclined end portions 105 which increases the size of the vacuum port and therefore permits larger quantities of liquid to be handled. The vacuum port is formed between the edge of the belt and the longitudinal strip of material 106 also shown in FIG. 10. Since the edge portion 107 of the strip 106 is aligned with the upper edges of the ribs 103, the vacuum ports formed by the inclined edges 105 of the belt and the bottom edge 108 of the strip 106 provide a relatively large outlet for withdrawal of the filtrate. One structure embodying the belt 103 is illustrated in fragmentary section in FIG. 9. In as much as the structure shown in FIGS. 6 and 9 are similar in many respects, corresponding components in each of the figures are denoted by like numerals. Furthermore, the mode of operation of the structure shown in FIG. 9 is substantially identical to that illustrated and described in connection with FIGS. 1 and 2. Therefore, the major difference between the structures of FIGS. 6 and 9 involves the volume of material that can be handled by the filter.

Because of the relatively large size of this embodiment of the invention, the channel-shaped structure or shell has side elements 109 and a sectioned bottom 110. The side elements 109 each have upper and lower flanges 111 and 112 with the flange 112 being bolted to the base 110 by means of a bolt 113. The flange 111 is bolted to the plate 79 by means of a bolt 80. As in the case of the previous embodiment of the invention, all of the layers of plastic material are preferably formed of high molecular weight polyethylene with the exception of selected portions formed of tetrofluoroethylene or other similar material which can be readily replaced.

In the embodiment of the invention shown in FIG. 9, a layer or strip 114A of ultra-high molecular weight polyethylene is secured to the bottom element 110 by bolts 118 or other suitable fastening means. This serves to close the filtrate or vacuum channel 116. The bottom element 110 has a plurality of openings aligned with the threaded holes 117 formed in the layer 114A to accommodate filtrate ducts 117'. Strip 114A closes and seals the vacuum channel 116 which extends along the edge of the bolt 103.

The assembly of the bottom section 110 and strip 114A is bolted to flange 112 by bolts 113 and companion bolts, not shown, so that the entire assembly can be removed easily for cleaning and maintenance if required. Overlying the layer 114A are the layers 115A and 70A through 75A, similar to those illustrated in FIG. 6 and corresponding layers on the opposite side of the structure, namely 115 and 70 through 75 also in the same manner as illustrated in FIG. 6. Seals 82 are positioned between the layers 114A and 115A and layers 114A and 115'. While the seals 82 may also be inserted between various other layers including 70A through 75A, a suitable sealing cement may equally well be used in place of the seals both in the structure shown in FIG. 9 as well as the structure shown in FIG. 6. The entire structure is held together by means of elongated bolts 81 as in the case of the embodiment of the invention shown in FIG. 6. In addition, the structure of FIG. 9 may include one or more overflow conduits 89 as described in connection with the embodiment shown in FIG. 6 and the tetrofluoroethylene strips 106 are held in position by pins 88 also in the same manner described in connection with FIG. 6.

By reason of the relatively large size of the traveling belt filter shown in FIG. 9, one or more inlets for lubricating fluid may be utilized each of which being substantially similar to the fluid inlet 100 and distribution channel 99 as illustrated and described in connection with FIG. 5. Successive fluid inlets would normally be spaced along the length of the belt which may have a filtering portion approximating or even exceeding eighty feet in length. In the case of liquid lubricants, since larger quantities would be utilized, it is desirable to provide means for preventing the lubricating liquid from draining into the vacuum outlets. Accordingly, those portions of the layer 115' adjoining the edges of the belt 103 may be milled to form recesses 119'. A portion of each of these recesses is closed by a strip 119 of tetrofluoroethylene to leave a narrow channel 120 extending throughout the length of the belt to permit lubricant to be drained by way of an opening 121 and conduit 122. The channels 120 would preferably be positioned on each side of the belt and drains may be positioned along the length of the belt as required to handle the necessary volume of lubricant.

In operation of the structure shown in FIG. 9, filtrate is extracted by the vacuum conduits 117' on each side of the belt through the channel 122 formed by the left edge of the layer 70A as shown in FIG. 9 and the sloping edges 105 of the belt 103 and thence through the channel 116 and into the conduit 117'. Furthermore, as in the case of the structure shown in FIG. 6, the vacuum channels do not underlie any significant portion of the belt and therefore do not increase the friction between the belt and the supporting layer 119 and 115' with the result that the energy required for movement of the belt would be reduced to approximately twenty-five percent of that required for prior known filters. In addition, since the drag on the belt by reason of the vacuum is virtually negligible, there will not be any distortion of the belt or of the filter cloth overlying the belt and as a result the life of the belts and filter cloths is greatly increased. This not only reduces the cost for maintenance but also minimizes down time required for replacement of worn filter cloths and belts. Furthermore, the utilization of vacuum ports on each side of the belt greatly increases the capacity of the filter and liquid or slurry levels within the trough 68 will have little or no effect on the efficiency of operation of the apparatus. Moreover, by having the filter cloth extend upwardly on each side of the sloped trough walls, an effective seal is produced which prevents the drainage of slurry into the vacuum channels.

While only certain embodiments of the invention have been illustrated and described, it is understood that alterations, changes and modifications may be made without departing from the true scope and spirit thereof.

What is claimed is:

1. Filter apparatus having a traveling belt comprising an elongated filtering trough having a base and side walls, a roller adjoining each end of said trough, an endless belt having transverse ridges carried by said rollers with the upper portion of said belt overlying and supported by the base of said trough and with the edges of the belt in spaced relationship to said side walls of said trough defining spaces therebetween, vacuum channels in the base of said trough and communicating with said spaces between each edge of said belt and the adjoining side wall of said trough which form vacuum ports, a source of vacuum communicating with said channels, a filter cloth overlying and traveling with said belt and completely overlying said vacuum channels whereby said source of vacuum functions to draw liquid through said filter cloth from a slurry containing liquids and solids supported by said filter cloth.

2. Filter apparatus having a traveling belt according to claim 1 wherein said belt includes transverse ribs and transverse portions of said belt disposed between said ribs having downwardly and outwardly inclined edge portions which form part of said vacuum channels.

3. Filter apparatus having a traveling belt according to claim 1 including a plurality of overflow outlets in the side walls of said trough with each outlet being disposed above the edges of said filter cloth.

4. Filter apparatus having a traveling belt according to claim 1 including means for introducing a lubricant between said belt and the base of said trough.

5. Filter apparatus having a traveling belt according to claim 1 wherein the base and walls of said trough are formed of a material having a low coefficient of friction.

6. Filter apparatus having a traveling belt according to claim 5 wherein said low coefficient of friction material is ultra-high molecular weight polyethylene.

7. Filter apparatus having a traveling belt according to claim 1 wherein said trough includes a pair of inclined edge ramps at each end thereof with the edge ramp on one end thereof guiding the edges of the filter cloth into engagement with the inclined surfaces of the trough and the edge ramp on the other end of said trough guiding the edges of the filter cloth into the plane of said belt for movement about a roller axially aligned with the adjoining belt carrying roller.

8. Filter apparatus having a belt according to claim 1 wherein said trough comprises an elongated structure of essentially rectangular cross section and a liner of relatively inert material having a low coefficient of friction, said liner having a flat bottom for slidably supporting said belt, and side walls extending upwardly from said bottom with the portions of the side walls adjoining the bottom sloping outwardly, said belt having a width not exceeding the distance between opposing vacuum channels.

9. Filter apparatus having a traveling belt according to claim 8 wherein said liner is formed of discrete layers of said material sealed one to the others and secured in position within said channel.

10. Filter apparatus having a traveling belt according to claim 8 wherein said vacuum channels comprise elongated ports extending along the length of said trough and vacuum conduits communicating with said ports.

11. Filter apparatus having a traveling belt according to claim 10 including overflow means formed in the side walls of said trough and conduits inclined downwardly and outwardly and communicating with said overflow means.

12. Filter apparatus having a traveling belt according to claim 11 wherein said overflow means comprise elongated channels formed in said sidewalls with an edge of said channel forming a dam to limit the level of liquid in said trough.

13. Filter apparatus having a traveling belt comprising an elongated trough having a base and side walls extending from said base with at least a portion of each side wall adjoining the base being inclined outwardly, belt carrying rollers at each end of said trough, an endless belt having transverse ridges carried by said rollers with said belt overlying and supported by said base of said trough, the edges of said belt being spaced from said side walls and defining spaces therebetween, elongated vacuum ports formed in said base and disposed between the edges of said belt and said side walls, vacuum conduits extending through said trough and communicating with said vacuum ports, a source of vacuum communicating with said conduits, an endless filter cloth overlying said belt, said vacuum ports and at least a portion of said inclined side walls and movable with said belt whereby said source of vacuum functions to draw liquid through said filter cloth from a slurry containing liquids and solids supported by said filter cloth.

14. Filter apparatus having a traveling belt according to claim 13 wherein the portions of said belt disposed between adjoining ridges are provided with inclined edges which form part of said vacuum ports.

15. Filter apparatus having a traveling belt according to claim 13 wherein said trough comprises an elongated channel structure lined with a material having a low coefficient of friction.

16. Filter apparatus having a traveling belt according to claim 13 wherein said trough includes barriers at the ends thereof, a plurality of dams between said barriers dividing said trough into successive sections, individual vacuum ports in each section with selected sections including liquid overflow outlets.

* * * * *